Figures 1, 2, 3:
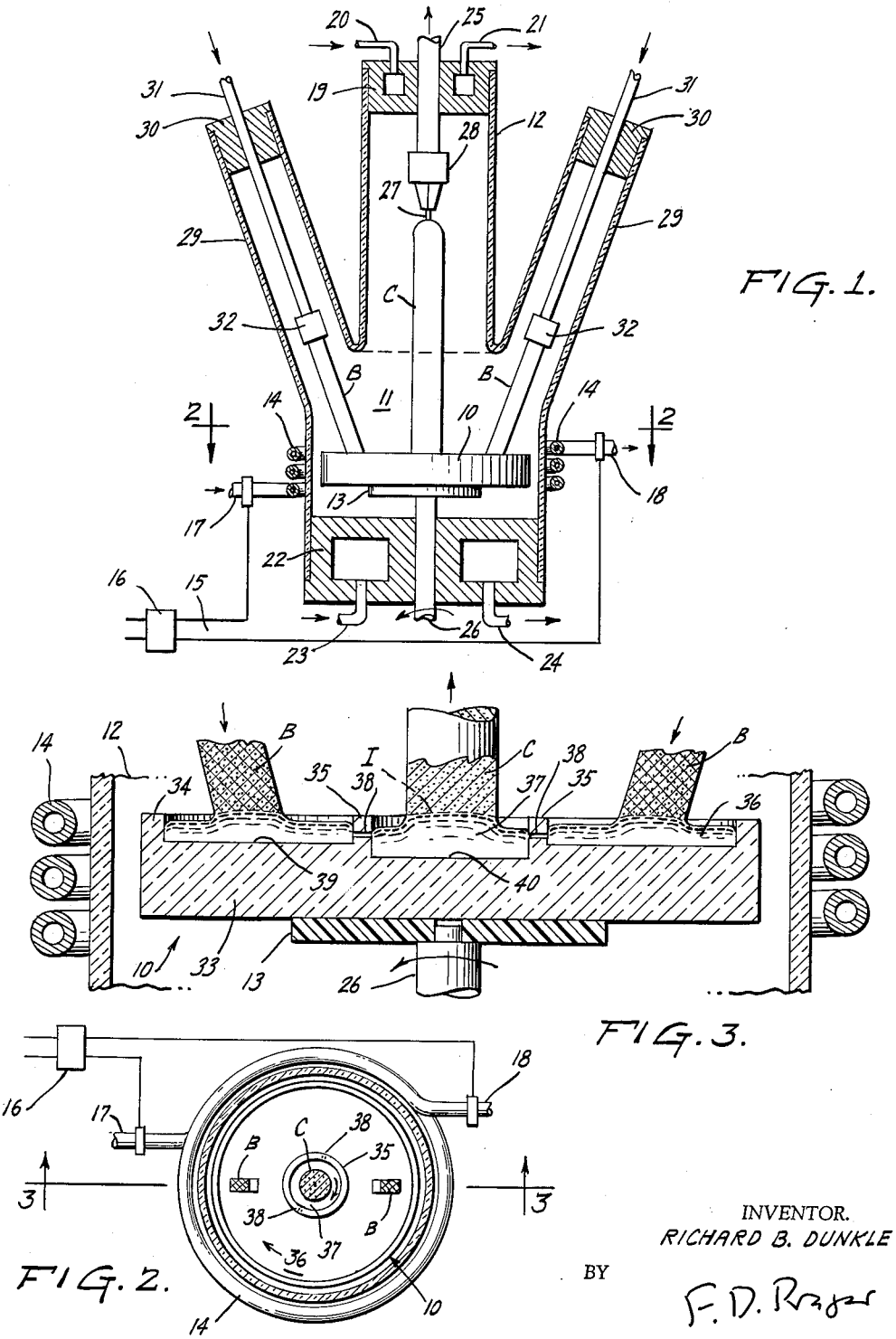

March 28, 1961 R. B. DUNKLE 2,977,258
PRODUCTION OF SEMICONDUCTORS AND THE LIKE
Filed April 9, 1958

INVENTOR.
RICHARD B. DUNKLE
BY
F. D. Rager
ATTORNEY 2,977,258
PRODUCTION OF SEMICONDUCTORS AND THE LIKE

Richard B. Dunkle, Ambler, Pa., assignor to Philco Corporation, Philadelphia, Pa., a corporation of Pennsylvania Filed Apr. 9, 1958, Ser. No. 727,441
2 Claims. (Cl. 148—1.6)

This invention relates to techniques for producing crystals such as those of semiconductive material, and particularly for producing crystals of closely controlled characteristics. A main application of the invention relates to the production of semiconductive ingots which have not only monocrystalline structure but also substantially uniform resistivity. The invention also provides apparatus for carrying out such techniques.

Heretofore it was a matter of great difficulty and expense to produce closely controlled materials of the type mentioned; yet there has been an increasing demand for such materials. It is therefore a general object of this invention to produce such materials, and particularly semiconductive bodies of monocrystalline structure and at the same time, of substantially uniform resistivity. A particular object is to produce such bodies by simple, efficient and inexpensive methods and means. Further particular objects are to make such bodies relatively large, and to make their shape regular and uniform.

Additional difficulties were hitherto encountered, which were caused at least in large part by the fact that the supply of "melt" from which a crystal must be pulled was subject to thermal fluctuation. This in turn was either due to gradual exhaustion of such melt, or due to factors such as local replenishment of the solid material, depending on the process and equipment employed. It is an important object of this invention to reduce or substantially to eliminate all disturbances of such types.

This was found possible by surprisingly simple means. More particularly it was found that the objects can be achieved by a technique comprising the maintenance of a system of shallow, concentric, intercommunicating melt pools, supported by and continuously rotating with a crucible, preferably in a protected, peripherally heated zone filled with neutral gas. Solid melt-replenishing material, such as polycrystalline bar stock, can be downwardly supplied to and melted in an outer, annular part of the system of shallow melt zones and can be positively diffused therein with the aid of the rotation of the crucible. The annular zone is thermally and/or otherwise separated from but hydraulically connected with a central part of the system, wherefrom an ingot is upwardly withdrawn. As a result of such conditions, it becomes possible to safely withdraw ingots of semiconductive material which are not only purely monocrystalline but also of substantially uniform resistivity and similarly uniform cross-sectional shape and size.

The invention will be understood more thoroughly upon a study of a preferred embodiment of the new apparatus, as shown in the drawing appended hereto. Figure 1 is a central, vertical section through the apparatus; Figure 2 is a horizontal section taken along line 2—2 in Figure 1; and Figure 3 is an enlarged section taken generally along line 3—3 in Figure 2.

According to the invention a crucible 10 for producing a crystal C from germanium melt or the like is provided in the general form of a thick or massive disc, which desirably consists of a heat-resistant material such as graphite, having substantial thermal conductivity but having lower thermal conductivity than the melt itself possesses. Materials other than graphite can be used in some instances; for instance, a crucible disc for the production of silicon crystals may comprise a graphite body with a lining of highly purified quartz (not shown).

The disc or crucible is rotatably disposed in the center of a lower portion 11 of a vertical furnace tube 12, the tube being desirably made of heat-resistant glass. The crucible is shown as rotating on and with a heat insulating, refractory support, shown as a pad 13 and made of ceramic or the like. The crucible is further associated with a single, peripherally disposed heat generating system, controlled at a single point; for instance, an induction coil 14 is schematically shown as concentrically surrounding the furnace tube, adjacent the crucible, and this coil is supplied with electrical current by conductors 15, under suitable control at point 16.

Desirably, induction coil 14 is hollow as shown and is provided with an inlet 17 and an outlet 18 for cooling fluid, such as water. Similar cooling is diagrammatically shown as being provided for a closure member 19, disposed at the top of furnace tube 12 and having coolant inlet and outlet means 20, 21, and other closure members, such as a bottom closure 22 of the tube, have coolant inlet and outlet means as indicated at 23, 24. Closures 19, 22 also serve as bushings admitting, respectively, a crystal pulling shaft 25 and a crucible supporting and rotating shaft 26, said shafts entering the furnace tube from above and below, respectively, and being arranged centrally of the tube and crucible. Each shaft can be rotated and can also be raised and lowered by suitable mechanism (not shown). The lower shaft 26 has insulator pad 13 secured to the top end thereof, whereas the upper shaft 25 has a suitably selected and oriented crystal seed 27 held at the lower end thereof by a chuck 28.

Rotation of the crucible relative to the seed, in coaxial relation thereto, is known to be frequently desirable or necessary for a number of purposes, including the formation of an ingot of desirable, elongated form; but such conventional rotation can or must be omitted in certain other instances. According to the present method, however, there is provided rotation of the crucible and of two concentric melt pools thereon, relative to an eccentric source of thermal unbalance, said source comprising a supply of solid semiconductor material which may for instance be in bar form B. The downward supply of solid melt-replenishing material B is necessary eccentric to a central ingot upwardly withindrawn when the latter is coaxial to the crucible as is desirable for thermal balance; and it has been found that such eccentricity, in some of the most advanced systems hitherto used, was a primary cause of thermal unbalance and consequent trouble in the critical, central region where the newly formed crystals congeal. The present invention eliminates this unbalance and trouble.

The bars B enter the furnace through furnace feed or intake means, shown as comprising a pair of branch tubes 29, joining chamber 11 from above and extending at acute angles to shafts 25, 26. Each intake branch tube has a top portion sealed by a bushing 30, providing an inlet for a feeder shaft 31 which holds a bar B by a holder 32. These shafts are gradually lowered, while shaft 25 is gradually raised, for which purposes suitable mechanisms (not shown) are provided. The aforesaid angular arrangement of feed members 29, 31 is adavntageously used to avoid interference between rising and descending chuck elements 28, 32, even when large chuck elements are used, for instance to hold bar stock B of large or irregular cross section.

The crucible 10, as shown in Figures 2 and 3, comprises a thick and massive disc 33, which has as integral parts thereof, a relatively low annular wall 34, upstanding from the periphery of the disc, and a similarly low annular wall 35, concentrically formed in an inner portion of the disc. The two walls provide an outer, annular, shallow melting chamber 36 and an inner, circular, slightly deeper but still shallow crystallizing chamber 37. As best shown in Figure 3, this central chamber 37 is slightly wider but several times less deep than crystal C is thick, and outer melt zone 36 is even less deep than the central zone. The inner wall 35 is apertured, desirably by a pair of small ports or openings 38 positioned diametrically opposite one another, adjacent the bottom 39 of the outer chamber and slightly above the bottom 40 of the inner chamber. In some cases it is preferable that the diameter of each port 38 be small in comparison with the height of the wall 35, in order to allow only an inward flow of melt from the outer annular chamber to the inner chamber, as material is withdrawn from the latter and resupplied to the former, and thus to counteract outward movements, for instance outward molecular or Brownian movements of materials of different temperatures or dope concentration through the apertures. However, of course the ports must be large enough to allow gravitational flow of the melt through the same, under the limited head differentials prevailing between the shallow pools.

Heretofore, various systems of melting and crystallizing chambers or so-called pots have been used in furnaces for the production of semiconductor ingots and the like. The system constructed according to the present invention differs from such prior systems in several respects, some of which will best be explained in connection with the operation thereof, to be described presently. Structurally, it is important that the present system is circular-annular, that it is adapted to rotate relative to the feed system B, and that it comprises a massive crucible, a pair of shallow melt chambers and a suitably apertured wall of suitably selected thermal conductivity between said chambers. Preferably, a single, peripheral heat source 14, with a single heat control 16, is provided for the entire system.

In order to prepare for operation of the furnace as illustrated, bushings 19 and 30 are removed, thereby affording access to the furnace. A suitable amount of germanium along with doping or impurity material is then deposited in crucible chambers 36 and/or 37. This material may for instance consist of germanium containing a small percentage of antimony to provide donors and thereby to produce an N-type ingot, or of germanium with gallium to provide acceptors and thereby to produce a P-type ingot. A suitably oriented monocrystalline seed 27 is inserted in chuck 28; bushing 19 is inserted in tube 12; and shaft 25 is lowered to hold seed 27 centrally of crucible chamber 37 and adjacent the top thereof. Rigid bars B of highly purified polycrystalline semiconductor material, such as germanium, are attached to holders 32, said bars being arranged to reach diametrically opposite points in crucible chamber 36 when holders 32 and bushings 30 are properly positioned in branch tubes 29. These germanium feed bars may be either substantially free of, or suitably provided with minute amounts of, such dope as originally provided in chamber 37, depending on the exact procedure to be used as to duration and succession of crystal pulling operations and related steps.

The basic, preparatory steps are completed by flushing air out of tube 12 with nitrogen or the like and by then starting a continuous flow of inert gas, such as hydrogen and/or nitrogen, into and out of tube 12 through suitable ports, not shown.

Normal operation of the illustrated furnace requires the passage of alternating current through electrical control unit 16, wires 15 and coil 14, whereby alternating current is induced in crucible 10. Such induced alternating current is accordingly started, thereby generating heat, primarily in the peripheral parts of the massive disc portion 33 and of the outer pool 36. As a result the crucible becomes very hot and lower portions of bars B are liquefied. The resulting melt fills annular chamber 36 and flows gravitationally through ports 38 into central chamber 37. As the central chamber substantially fills with hot melt, the bottom end of monocrystalline seed 27 fuses with this melt. In the meantime the furnace mechanism has been started, rotating crucible 10 and gradually lowering bar holders 32 and raising seed chuck 28. Accordingly, successive amounts of new melt, which adhere to seed 27, are withdrawn from central pool 37 to raised elevations, where they freeze and crystallize, the temperature at the top of central pool 37 being below those prevailing at the top of annular pool 36 and being low enough to cause congealing of the melt.

As the slowly withdrawn material is in contact only with monocrystalline seed 27, the newly formed ingot material has monocrystalline or "single crystal" structure, and this forming of monocrystalline material continues in normal operation, as the ingot C is kept out of contact with any solids other than the seed.

The impurity distribution in ingot C, relative to both axial and radial dimensions of the ingot is substantially as uniform as are the temperatures at melt-crystal interface I, so long as an adequate impurity concentration is present in the central or crystallizing chamber 37. In typical applications of the process there may be present in this chamber a few grams of germanium, doped for instance with .2 milligram to 200 milligrams of antimony or with similarly small amounts of gallium, depending on the type of transistor material to be produced. It is possible in most cases to grow at least a few ingots, for instance typically about three to five ingots weighing 1200 grams each, from such a supply of dope, replenished by intrinsic or very minutely doped bar stock. After such growing of a certain number of ingots it is generally considered desirable to provide a new batch of material with controlled dope content, in order to avoid dangers such as the possibility of gradual concentration of undesired types of impurities.

It may be well to point out that the aforementioned specific and quantitative details and ranges of figures are stated only for purposes of illustration. Similarly it will be mentioned only for illustration of certain specific applications of the invention that a crucible of 6 inches diameter may be rotated for instance at 1 r.p.m. and that bars B may be lowered, and crystal C raised, at velocities of a few millimeters or centimeters per minute, depending on the specific arrangements as to type of material, number and size of bars and size of crystal desired. Temperatures of about 1020 degrees may in some cases be induced in the peripheral or annular melt pool 36, outside of wall 35.

Maintenance of an adequate impurity concentration in the melt pool or pools, by arrangements as indicated, is relatively simple in spite of the smallness of said pools relative to the ultimate volume of ingot material desirably developed therefrom. Outward flow and diffusion of dope can be avoided if desired, by the provision of wall 35 and suitable smallness of ports 38. Of the dope which is thus retained in chamber 37, only minor portions are removed by the continued pulling of crystal C, at the temperatures, pulling rates and other working conditions as described, so that practically uniform concentrations of desired dope or impurity are present in the crystal-forming chamber 37.

On the other hand, the maintenance of sufficiently uniform temperatures at a crystal-melt interface has hitherto been a matter of great complexity, and yet a high degree of thermal uniformity was and is required, both along and across the axis of the ingot crystal being formed, in order to keep resistivity and related characteristics of the finished material within the desired, usually very close limits. Among the numerous influences which tend to upset such close control are not only the fluctuations of local cooling effects which tend to occur for instance as feed rods B are gradually shortened and crystal C is gradually lengthened, but also fluctuations of melt flows caused by electromagnetic effects of electrical currents in induction coil 14, crucible 10 and the melt pools. Provision is made to keep all of these influences small and insignificant. Particularly the combined shallowness and separate, annular arrangement of the bulk of fluid melt 36, in accordance with this invention, is useful in this connection. The sensitivity of the semiconductor material is such that compensation for influences of this kind is very significant.

Heretofore a variety of systems were tried to achieve such compensation. In one such system, a relatively voluminous pool of molten material was provided in the crucible, equal in mass to at least one complete, new crystal. An attempt was made to minimize temperature gradients in the crucible, and temperature variations at the point where the crystal was pulled, by the thermal mass of this pool. It was found, however, that temperatures prevailing at certain points of such a system were still subject to significant variations, as the thermal mass of the pool was gradually depleted, thereby leading to non-uniform resistivity of the crystal. In another system, a relatively small pool of melt, maintained by continuous melting of solid material, was kept in communication with the point where the crystal was pulled, and an attempt was made at the latter point to constantly measure and regulate temperatures below the growing ingot, by auxiliary heating equipment which selectively supplemented the effect of a permanently energized heat source. This latter system was found subject to several complications, including those caused by the periodic increments and decrements of local temperature which formed a necessary adjunct of such arrangement and regulation. Some such variations were required even when most elaborate provisions were made to anticipate and/or minimize the demand for an increment or decrement, and of course to eliminate "hunting" and the like.

The expedient of using a single, peripheral heat source 14, and a rotating crucible as described, with concentric, shallow, constant volume pools of melt, and with controlled generally inward flow of melt into the central pool, has been found to effect appreciable improvement. In spite of the eccentric feed of solid bars B, required by the central removal of crystal C, temperature gradients are kept substantially radial, by influences comprising the contiuous rotation and peripheral heating of disc 33, and the shallowness and functional separation of concentric melt chambers 36, 37.

Of course there are slight local irregularities of temperatures prevailing on the top surface of the outer melt pool, due to the eccentric feed and melting of solid rods B. However, every area of such irregularity, in the new system, is limited to a small, isolated zone in the annular melt pool, which zone surrounds the bottom end of a rod B. The so established irregularity does not appreciably affect the thermal gradients in the massive crucible disc itself, nor does it reach into the shallow central melt chamber 37. While the exact form and size of the so established, isolated melt zones of relatively lower temperature may tend to vary slightly, at the start of operation, thereby tending to modify the exact, initial forms of the melt-crystal interface I, such variation can be prevented from occurring or at least from assuming serious proportions during normal operation, by suitable readjustment of conventional current control means 16.

It is important in this connection to note that in normal operation, peripherally uniform temperatures prevail at each level of central chamber 37, due to the combined effects of rotation of the crucible relative to bars B, the induced currents and flows, and the molecular movements of melt particles. Thus no thermal differential of even slight significance for the elevation or shape of crystal-melt interface I occurs in central chamber 37 at any time; and it seems to be for this reason that required readjustments of thermal balance—mainly in the initial steps—can readily be achieved by the single control 16, directly affecting only the heat balance of the outer or melting chamber 36. By contrast, substantial thermal unbalance results if the rotation of crucible 10 relative to bars B is dispensed with; and in prior methods, even less adequate thermal balance was achieved, even when complex means were used for controlling temperatures in melting and/or crystallizing chambers.

While only one embodiment of the invention and one mode of operation thereof have been described, it should be understood that the method can be performed in many other ways and that the details stated are not to be construed as limitative of the invention, except in so far as is consistent with the scope of the following claims.

I claim:

1. A method of producing monocrystalline semiconductor crystals and of minimizing differences of resistivity between portions thereof, which method comprises: jointly horizontally rotating a pool of semiconductor crystal melt and a thick, solid block of heat conductive refractory material which underlies said pool and supports the same; maintaining said pool shallow relative to the thickness of said underlying block; generally separating a central portion of the rotating pool from an annular outer portion thereof while allowing local intercommunication from the outer to the inner portion and while pulling an ingot from the central portion and feeding solid polycrystalline semiconductor material to localized areas of the outer portion; supplying heat to said block so as to heat said inner and outer portions of said pool by means of said block; and thereby, due to heat retention in and heat conduction in and from said thick solid block, minimizing relative cooling of said local areas of the outer portion of the pool and consequent thermal unbalance in the inner portion of said pool.

2. Apparatus for producing uniform "single" semiconductor crystals, comprising: a generally cylindrical, solid and massive body of heat conductive refractory material, said body having its cylinder axis vertically oriented; low, annular wall means upstanding from said body and defining a dished upper portion, the depth of which is smaller than is the thickness of said solid and massive body; a low, annular, locally apertured partition for said dished portion, upstanding from said body, concentrical therewith and of approximately similar, small depth as said dished portion; means for rotating said body about said vertically oriented axis; means for feeding solid polycrystalline semiconductor material into local areas of said dished portion outwardly of said partition; means for heating said massive body of heat conductive material so as thereby to heat and melt said solid material and to maintain it in molten condition in said dished portion; and means for pulling a crystal from the molten material in said dished portion within said partition.

References Cited in the file of this patent

UNITED STATES PATENTS

| 2,809,136 | Mortimer | Oct. 8, 1957 |
| 2,892,739 | Rusler | June 30, 1959 |

FOREIGN PATENTS

| 755,422 | Great Britain | Aug. 22, 1956 |

UNITED STATES PATENT OFFICE

CERTIFICATION OF CORRECTION

Patent No. 2,977,258                          March 28, 1961

Richard B. Dunkle

It is hereby certified that error appears in the above numbered patent requiring correction and that the said Letters Patent should read as corrected below.

Column 2, line 51, for "necessary" read -- necessarily --; line 52, for "withindrawn" read -- withdrawn --; lines 70 and 71, for "adavntageously" read -- advantageously --; column 5, line 52, for "contiuous" read -- continuous --.

Signed and sealed this 15th day of August 1961.

(SEAL)
Attest:

ERNEST W. SWIDER
Attesting Officer

DAVID L. LADD
Commissioner of Patents